(12) United States Patent
Ikami et al.

(10) Patent No.: US 6,604,900 B2
(45) Date of Patent: Aug. 12, 2003

(54) PIERCE NUT

(75) Inventors: Hidenori Ikami, Niwa-gun (JP); Takashi Asakura, Niwa-gun (JP)

(73) Assignee: Aoyama Seisakusho Co., LTD, Aichi (JP)

(*) Notice: Subject to any disclaimer, the term of this patent is extended or adjusted under 35 U.S.C. 154(b) by 0 days.

(21) Appl. No.: 10/019,158

(22) PCT Filed: May 17, 2001

(86) PCT No.: PCT/JP01/04110
§ 371 (c)(1),
(2), (4) Date: Dec. 17, 2001

(87) PCT Pub. No.: WO01/88389
PCT Pub. Date: Nov. 22, 2001

(65) Prior Publication Data
US 2002/0159858 A1 Oct. 31, 2002

(30) Foreign Application Priority Data
May 19, 2000 (JP) ......................................... 2000-148118

(51) Int. Cl.[7] ................................................. F16B 37/04
(52) U.S. Cl. ........................................ 411/181; 411/428
(58) Field of Search ................................ 411/180, 181, 411/183, 428, 534, 395

(56) References Cited

U.S. PATENT DOCUMENTS

| | | | | | |
|---|---|---|---|---|---|
| 360,676 | A | * | 4/1887 | Gaines | 411/428 |
| 837,767 | A | * | 12/1906 | Aims | 405/152 |
| 2,064,377 | A | * | 12/1936 | Gordon | 267/50 |
| 2,518,468 | A | * | 8/1950 | Hrding | 411/269 |
| 3,399,589 | A | * | 9/1968 | Breed | 411/428 |
| 4,690,599 | A | * | 9/1987 | Shinjo | 411/180 |
| 4,830,559 | A | * | 5/1989 | O'Herron | 411/428 |
| 5,340,251 | A | * | 8/1994 | Takahashi et al. | 411/179 |
| 5,531,552 | A | * | 7/1996 | Takahashi et al. | 411/179 |

* cited by examiner

*Primary Examiner*—Flemming Saether
*Assistant Examiner*—Jori Schiffman
(74) *Attorney, Agent, or Firm*—Edwards & Angell, LLP; David G. Conlin; David A. Tucker

(57) ABSTRACT

A pierce nut having an inner cylindrical portion (2) provided centrally on an underside of a main nut body (1) and formed at an inner surface thereof with a female thread (3), an outer cylindrical portion (4) provided on a peripheral edge of an underside of the main nut body, and a recess (5) defined by an outer surface of the inner cylindrical portion and an inner surface of the outer cylindrical portion, characterized in that at least one passage (6) is provided to communicate between the recess and an outer surface of the pierce nut to enable flowing of a fluid.

4 Claims, 6 Drawing Sheets

PIERCE NUT

TECHNICAL FIELD

The invention relates to a pierce nut, and in particular, to a pierce nut, which can ensure a high joining strength even when applied to a metallic plate, to which a large amount of oil adheres.

BACKGROUND ART

In place of weld nuts, which necessitate a weld equipment and involve problems of poor positional accuracy and failure of clamping caused by spreading of sputter, pierce nuts simply applicable to a metallic plate such as aluminum plate, steel plate and the like have been recently used widely. More specifically, pierce nuts ensure a desired joining strength as the result of striking a nut itself into a metallic plate set on an exclusive lower die from above by means of a pressing tool such as punch or the like causing an inner cylindrical portion of the nut to form a hole at a predetermined position of the metallic plate, to which the pierce nut is applied, at the time of such striking, and using the lower die to cause plastic flow of a portion near the hole of the metallic plate, into a recess formed between the inner cylindrical portion of the nut and an outer cylindrical portion of the nut to cause the portion to bite into the recess.

FIG. 8 is a view illustrating a state, in which a conventional pierce nut is struck into a metallic plate, to which an oil adheres. The pierce nut comprises an inner cylindrical portion 2 provided centrally on an underside of a main nut body 1 (Its wall is parallel to an axis. Its inner space is contiguous to a center of an upper surface of the nut. Its inner surface is formed with a female thread, which functions as a nut.), an outer cylindrical portion 4 (Its wall portion is normally tapered as if its top were disposed on a point on an axis but suffices to be shaped to be capable of preventing the metallic plate having undergone plastic flow from being drawn out), and a recess 5 formed between an outer surface of the inner cylindrical portion and an inner surface of the outer cylindrical portion. When the pierce nut of such construction is struck into a metallic-plate 8, to which an oil adheres (Concretely, the metallic plate is placed on a projection 10 of a lower die 9, and the pierce nut placed on the metallic plate so that a central axis of the pierce nut coincides with that of the lower die is pressed against the metallic plate by means of a pressing tool such as a punch or the like. As a result, the metallic plate is punched out by the inner cylindrical portion of the pierce nut to be formed with a hole, a diameter of which corresponds with an outer diameter of the inner cylindrical portion of the pierce nut. When the pierce nut is further pressed toward the lower die, the projection of the die exerts pressure on a peripheral edge portion of the hole of the metallic plate, the portion is caused to undergo plastic flow to be pushed deep into the recess of the pierce nut, and eventually the metallic plate thus pushed is caused to make caulking and joining through the recess of the pierce nut.), the striking action causes an oil flowing into the recess to be confined in the portion to form a puddle of oil 7, so that the metallic plate, which should have been filled deep into the recess, that is, the oil puddle forming portion due to plastic flow, cannot reach the recess deep, and there is resulted a disadvantage that a state, in which the metallic plate is joined to the pierce nut, becomes incomplete (Concretely, a clinching force, that is, a force for preventing the pierce nut from being axially drawn out, and the slipping torque, that is, a force for preventing the pierce nut from rotation about its axis are exceedingly reduced).

Accordingly, in the case where a pierce nut is to be struck into a metallic plate, to which a large amount of oil adheres, there is caused a problem that a worker must beforehand perform a preliminary work such as wiping-off or air-blowing of an oil adhered to the metallic plate, which not only imposes surplus load on the worker but also incurs lowering of working efficiency and hence an increase in cost.

DISCLOSURE OF INVENTION

The invention has been contemplated to solve the above-mentioned problems of the prior art and to provide a pierce nut which can ensure a high joining strength equivalent to that of the prior art even when applied to a metallic plate, to which a large amount of oil adheres.

More specifically, a pierce nut according to the invention has an inner cylindrical portion 2 provided centrally on an underside of a main nut body 1 and formed at an inner surface thereof with a female thread 3, an outer cylindrical portion 4 provided on a peripheral edge of an underside of the main nut body, and a recess 5 defined by an outer surface of the inner cylindrical portion and an inner surface of the outer cylindrical portion, and characterized in that at least one passage 6 is provided to communicate between the recess and an outer surface of the pierce nut to enable flowing of a fluid.

BEST MODE FOR CARRYING OUT THE INVENTION

Figure 1:
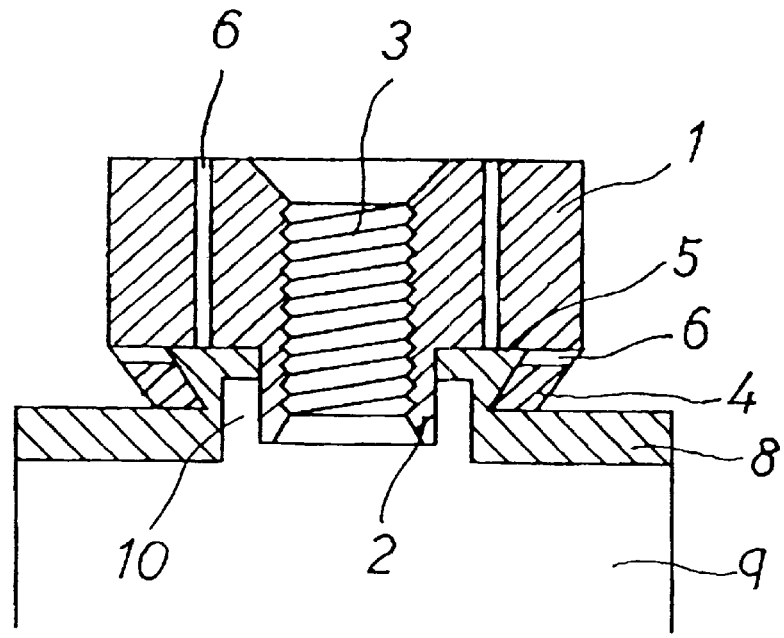
FIG. 1 is a partially cross sectional view illustrating a state, in which a pierce nut according to an embodiment of the invention is struck into a metallic plate, to which an oil adheres.

An explanation will be given below in details to the invention with reference to the drawings, which show embodiments.

A pierce nut according to the invention comprises, as described above, an inner cylindrical portion 2 provided centrally on an underside of a main nut body 1 (Its wall is parallel to an axis. Its inner space is contiguous to an upper surface of the main nut body. Its inner surface is formed with a female thread, which functions as a nut.), an outer cylindrical portion 4 provided on a peripheral edge of an underside of the main nut body (Its wall portion is normally tapered as if its top were disposed on a point on an axis. That is, it is in the form of a hollow circular conic, a head of which is cut, a wall of which is uniform in thickness. However, the invention is not limited to such configuration. Functionally, it suffices that a recess 5 (described in details later) defined by an outer surface of the inner cylindrical portion and an inner surface of the outer cylindrical portion can engage a metallic plate having undergone plastic flow so that the metallic plate is hard to be drawn out axially and to rotate on its axis.), a recess 5 defined by an outer surface of the inner cylindrical portion and an inner surface of the outer cylindrical portion, and passages 6 providing communication between the recess and an outer surface of the pierce nut to enable flowing of a fluid (oil) (see FIG. 1). In the embodiment shown, the passages 6 are in the form of a circular hole, and are provided to be arranged radially at a base of the outer cylindrical portion 4 and extend in parallel to an axis through the main nut body 1, but the number of them and their arrangement as well as their configuration are optional as described later as long as an oil removing function described later is fulfilled.

Even when the pierce nut of such structure is struck into a metallic plate, to which a large amount of oil adheres, the oil flowing into the recess 5 is discharged from the recess through the passages 6, whereby the puddle of oil 7 formed in application of prior pierce nuts is not formed and therefore it is possible to ensure the joining strength equivalent to that of a pierce nut applied to a metallic plate, to which any oil does not adhere. Also, as compared with the prior striking of a pierce nut after the adhering oil is wiped off or blown off with air, load on a worker is greatly reduced, which enables enhancement of working efficiency and hence a decrease in cost.

Figure 2:
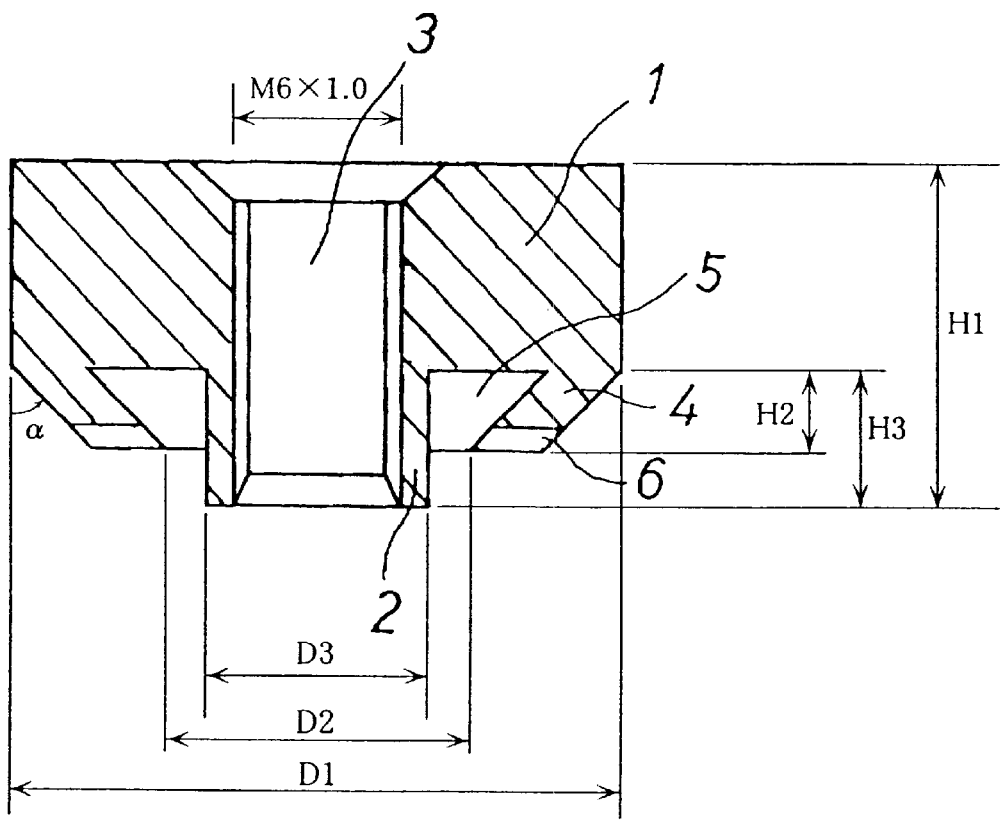
FIG. 2 is a cross sectional view showing another embodiment of a pierce nut according to the invention.
Figure 3:
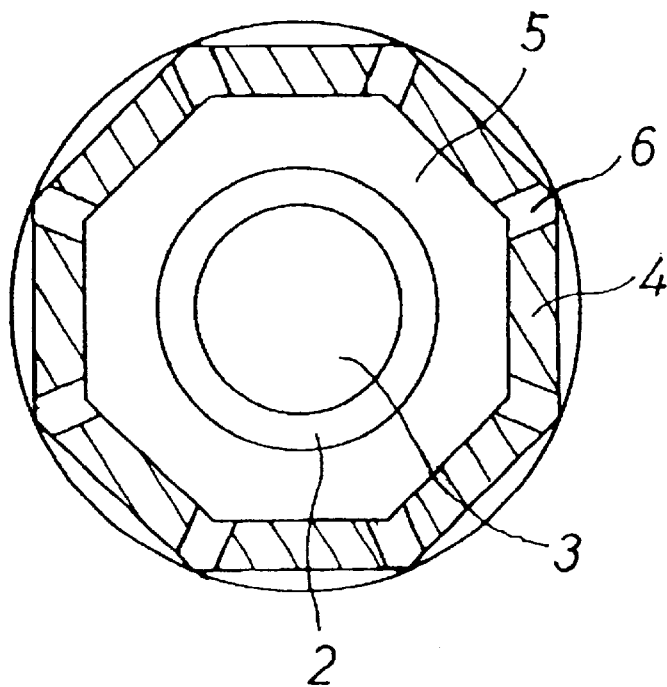
FIG. 3 is a bottom view showing the pierce nut shown in FIG. 2.

FIGS. 2 and 3 shown another embodiment of a pierce nut according to the invention, in which passages 6 in the form of an inverted U-shaped groove are formed on a bottom surface (a lower portion in FIG. 2) of an outer cylindrical portion 4 having an octagonal shape. As shown in the figure, the provision of a plurality of the passages 6 at regular intervals makes it possible to smoothly discharge to the outside an oil flowing into the recess, so that the configuration is preferable since an associated metallic plate 8 having undergone plastic flow is allowed to reach the recess 5 fully deep to thereby ensure a desired joining strength. Also, since the grooves serving as the passages are formed on the bottom surface of the outer cylindrical portion, work is easy as compared with forming of holes, which presents an advantage of the embodiment.

Figure 4:
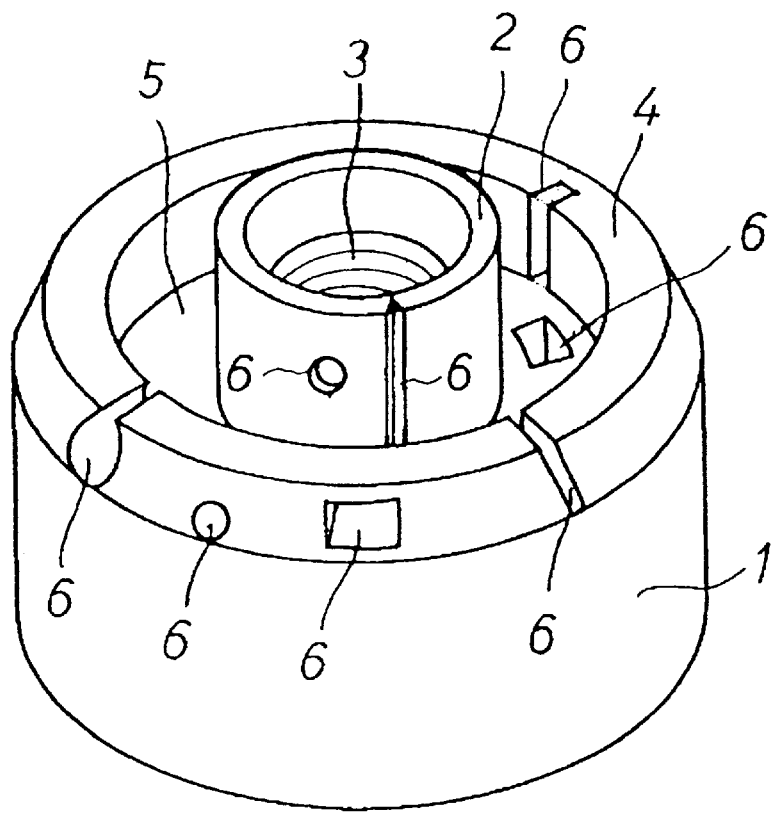
FIG. 4 is a perspective view showing together various embodiments in one figure.

In addition to a circular-shaped hole and an inverted U-shaped groove shown in FIGS. 1 to 3, the passages 6 may be in the form of square-shaped groove and hole, notch such as slit or the like and concave-convex serrations or the like, which allow an oil flowing into the recess 5 to be discharged outside, and are not limitative in shape. These examples are shown in FIG. 4, and the passages 6 may be provided not only on or in-walls of the outer cylindrical portion 4 but also on or in walls of the inner cylindrical portion 2 and the main nut body 1 itself. Also, the number of the passages may be suitably chosen in accordance with an amount of oil being discharged. However, the configuration, arrangement and the number of the passages, in particular, the latter two are related to the strength of the pierce nut itself, that is, deformation thereof and in its turn the accuracy of thread for nuts, and so should be determined in consideration thereof.

In addition, it goes without saying that the shape of the outer cylindrical portion of the pierce nut is not limited to a circular shape shown (see FIGS. 1 and 4) but can be made polygonal such as quadrangular, hexagonal, octagonal or the like (see FIGS. 2 and 3).

EXPERIMENTAL EXAMPLE

The pierce nut according to the invention and a prior pierce nut were compared with each other with respect to joining strength under coexistence of oil. The manner of such experiment is as follows:

(1) Pierce Nuts Being Tested

The pierce nut according to the invention shown in FIG. 2 (Exactly, the recess defined by the outer surface of the inner cylindrical portion and the inner surface of the outer cylindrical portion was not octagonal-shaped but circular-shaped, and the passages being four in number were V-shaped grooves to extend radially.), and the prior pierce nut corresponding to the nut, which is shown in FIG. 2 and from which the passages 6 are removed, were used (made of carbon steel corresponding to S10C). Incidentally, various dimensions were as follows: the female thread forming portion: M6×1.0 mm (pitch), an outer diameter of the pierce nuts: $D1=13$ mm, an inner diameter of a tip end of the outer cylindrical portion: $D2=10.3$ mm, an outer diameter of the inner cylindrical portion: $D3=8.0$ mm, an inclination of walls of the outer cylindrical portion: =about 10°, the entire height of the pierce nuts: $H1=6.0$ mm, a height of the outer cylindrical portion: $H2=1.1$ mm, a height of the inner cylindrical portion: $H3=1.8$ mm, a width of the passages: $w=0.7$ mm, and a depth of the passages: $d=0.5$ mm.

(2) Metallic Plate

A galvanized sheet iron (SGC material) having a thickness: $t=1.6$ mm was used.

(3) Mounting of the Pierce Nuts to the Metallic Plate (Preparation of Items Being Tested)

Contrary to the common practice, the pierce nuts were struck into the metallic plate by placing the pierce nuts, which were positioned upside down (a state shown in FIG. 4), on a punch serving as a pressing tool, setting the metallic plate between the punch and a die, and pressing the punch toward the die. In addition, prior to such striking, the same amounts of oil (press-working oil PG-3080 manufactured by Nippon Kosakuyu Company) were filled in the recesses of both pierce nuts to a depth corresponding to bottom surfaces of the V-shaped grooves.

(4) Method of Measuring the Clinching Force

Figure 5:
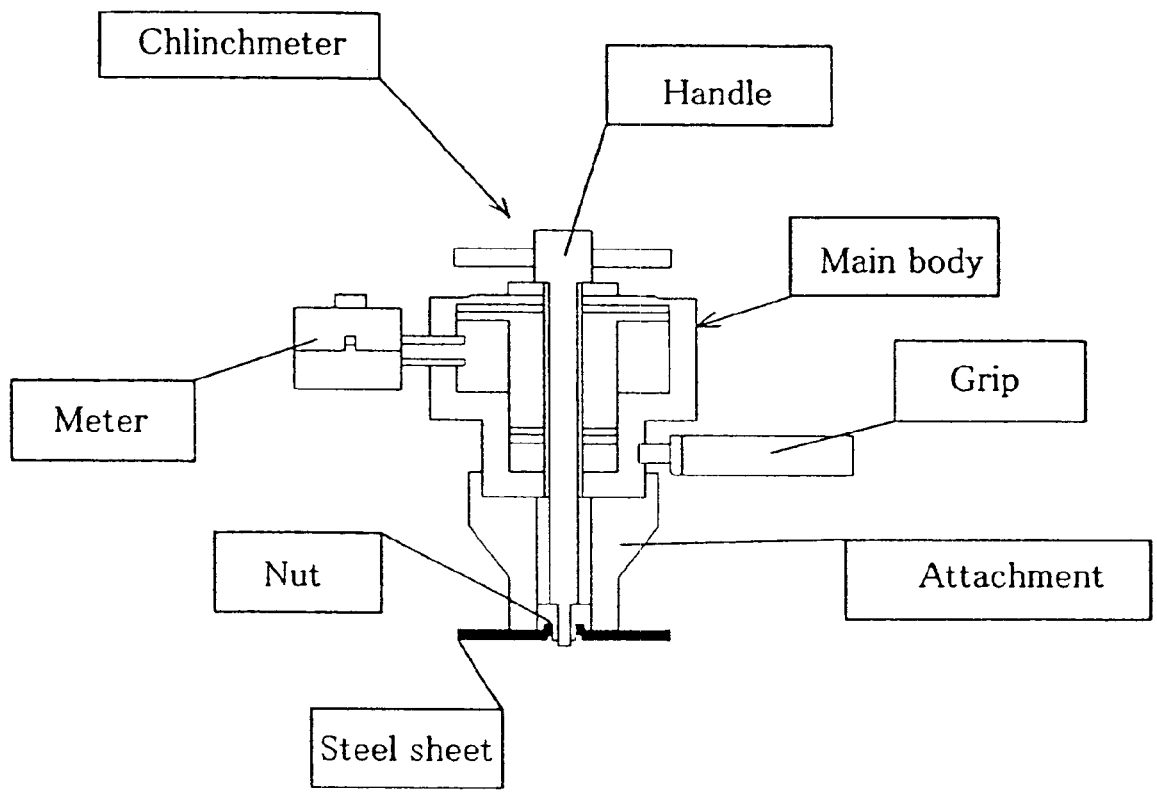
FIG. 5 is a view diagrammatically showing the manner, in which the joining strength (clinch force) of a pierce nut is measured (the lower figure being an enlarged view showing a pierce nut struck into a metallic plate, the arrow indicating a direction of drawing-out).
Figure 5:
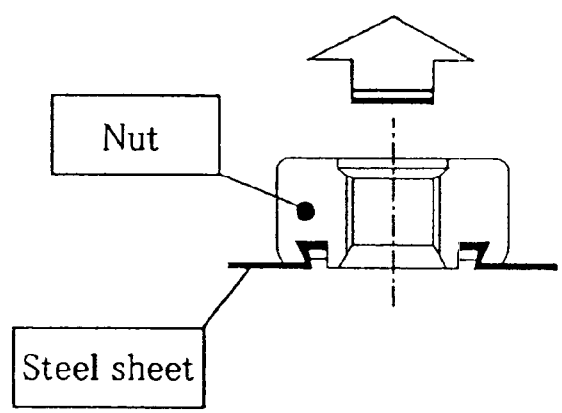

An apparatus shown in FIG. 5 was used. Measurement was carried out by turning a handle of a clinchmeter in a state, in which a tip end of an attachment contacted with the metallic plate around the outer cylindrical portion of the pierce nut (joined in advance to the metallic plate) having been prepared in (3), causing a threaded portion of the tip end to be threaded into the female thread forming portion of the pierce nut, and pulling out the pierce nut in a vertical direction, in which maximum load value indicated by the clinchmeter is taken as clinching force.

(5) Method of Measuring the Slipping Torque

Figure 6:
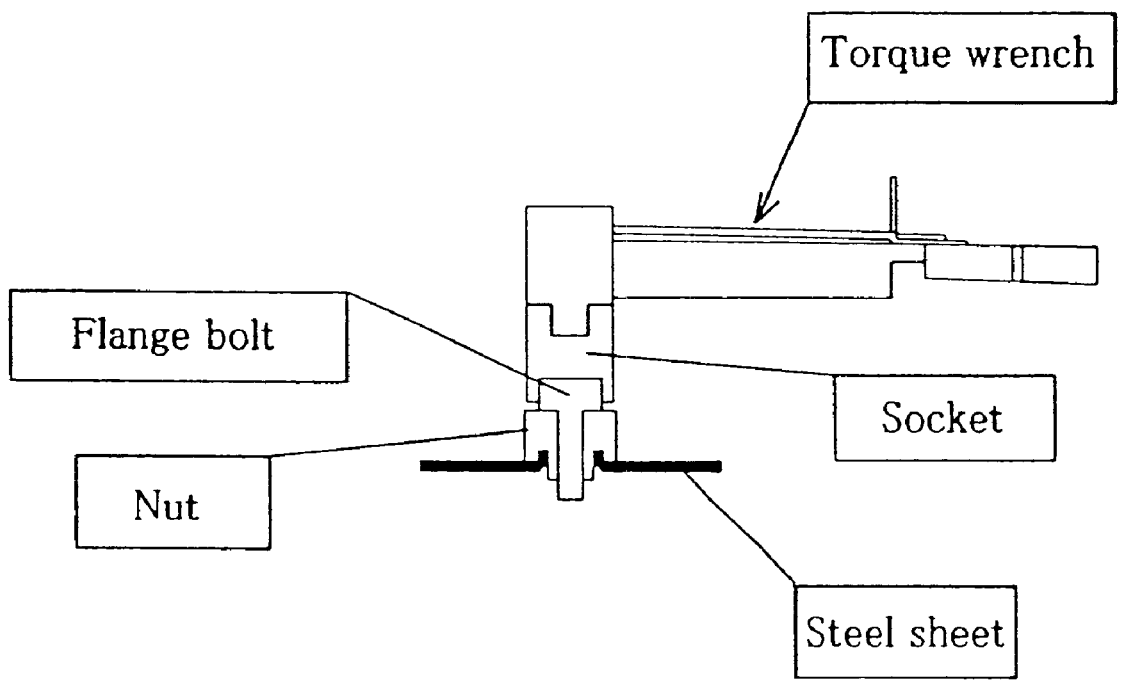
FIG. 6 is a view diagrammatically showing the manner, in which the joining strength (slipping torque) of a pierce nut is measured (the lower figure being an enlarged view showing a pierce nut struck into a metallic plate, the arrow indicating a direction, in which torque is applied).
Figure 6:
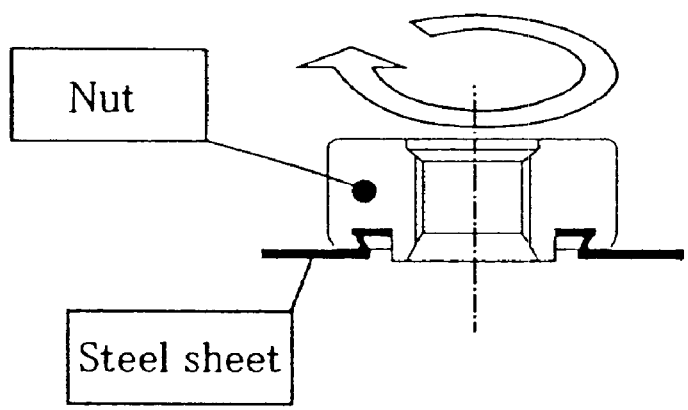

An apparatus shown in FIG. 6 was used. Measurement was carried out by connecting a torque wrench to a flange bolt threaded into the female thread forming portion of the pierce nut (joined in advance to the metallic plate) having been prepared in (3), and then turning the torque wrench in a clockwise direction to screw the flange bolt, and torque value when the pierce nut began to idle gave the slipping torque.

Figure 7:
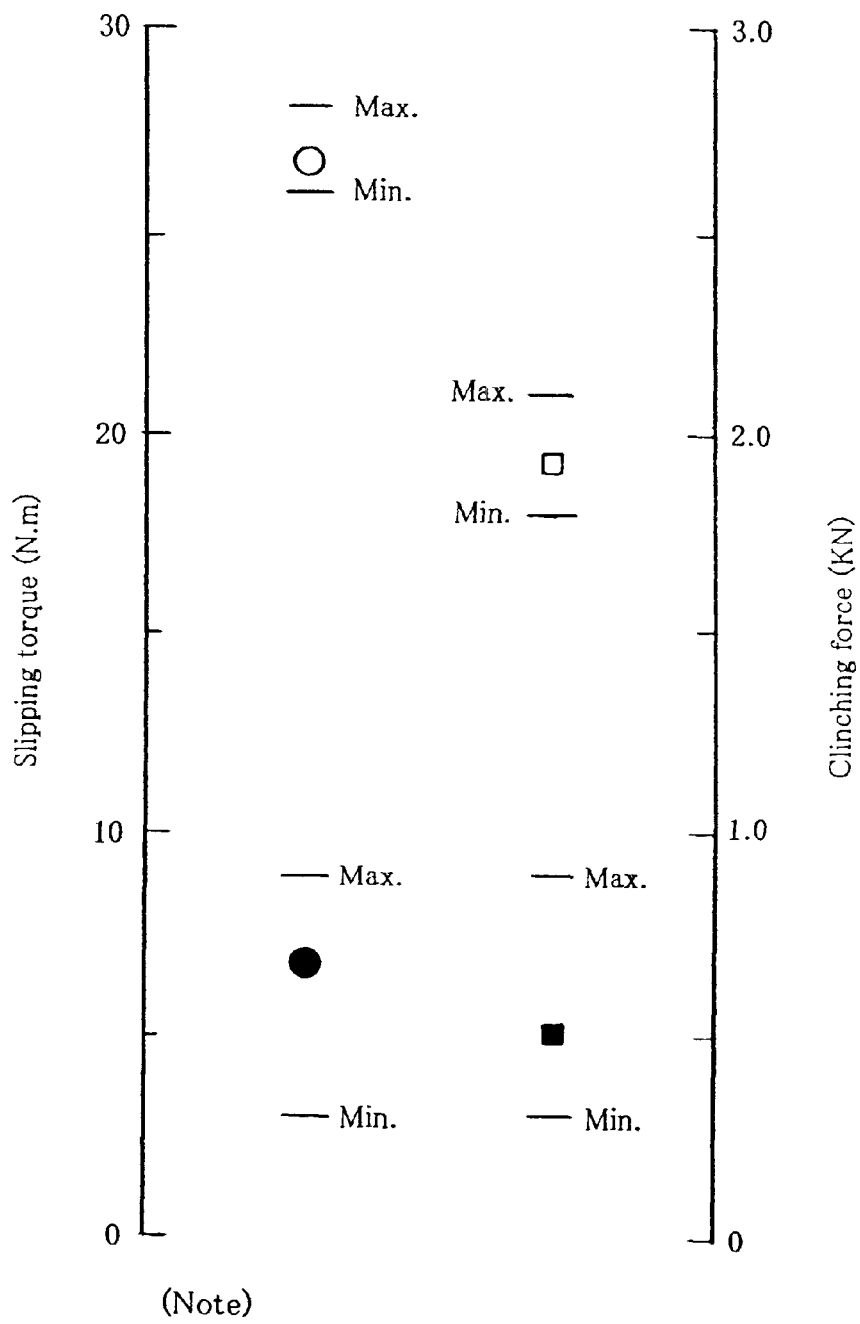
FIG. 7 is a graph indicating results of a test, in which the pierce nut according to the invention (shown in FIG. 2) and a prior pierce nut are compared with each other with respect to the joining strength under coexistence of oil.
Figure 8:
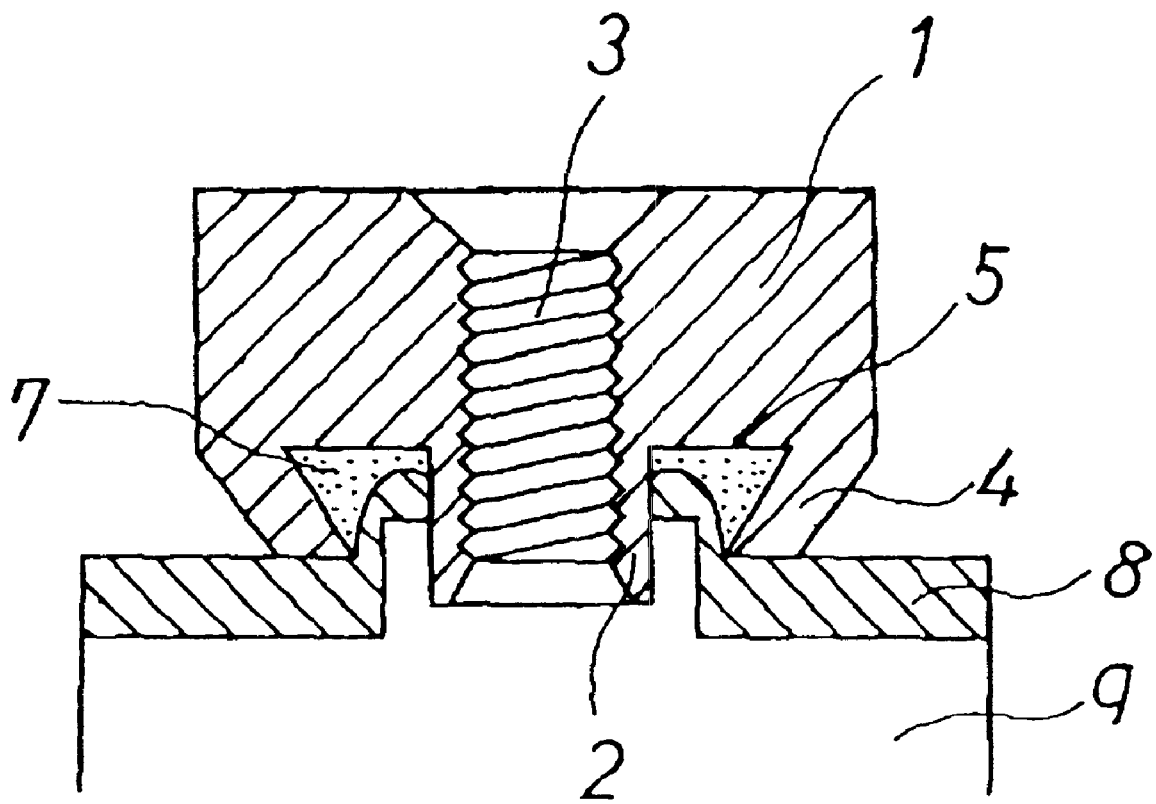
FIG. 8 is a partially cross sectional view illustrating a state, in which a prior pierce nut is struck into a metallic plate, to which an oil adheres.

The experimental results are shown in FIG. 7 (the number of items being tested are five for application of the clinching forces, and ten for application of the slipping torques.

As shown in the drawing, the pierce nut according to the invention gave a large joining strength (both the clinching force and the slipping torque are larger about four times) several times that of the prior one, even under coexistence of oil. Incidentally, the values given by the pierce nut according to the invention were equivalent to those given by the prior one under non-coexistence of oil.

INDUSTRIAL APPLICABILITY

As described above, the pierce nut according to the invention comprises the passages for providing communication between the recess and the outside to enable flowing of a fluid therebetween, and therefore can ensure the joining strength equivalent to that of the prior one even-in the case where a metallic plate being joined has an oil on its surfaces. Accordingly, application of the pierce nut to a metallic plate with an oil, which application has been conventionally apprehensive by virtue of a desired joining strength being not presented, can be spread, and so it becomes possible to enlarge a field, to which pierce nuts are applied.

What is claimed is:

1. A pierce nut having an inner cylindrical portion 2 provided centrally on an underside of a main nut body 1 and formed at an inner surface thereof with a female thread 3, an outer cylindrical portion 4 provided on a peripheral edge of an underside of the main nut body, and a recess 5 defined by an outer surface of the inner cylindrical portion and an inner surface of the outer cylindrical portion, characterized in that at least one passage 6 is provided to communicate between the recess and an outer surface of the pierce nut to enable flowing of a fluid, and in that when the pierce nut is mounted on a mounting member, the mounting member projects into the recess 5.

2. The pierce nut according to claim 1, wherein the passage 6 is a hole extending through a wall of the outer cylindrical portion 4 and the main nut body 1.

3. The pierce nut according to claim 1, wherein the passage 6 is a groove formed in a tip end of the outer cylindrical portion 4.

4. The pierce nut according to claim 1, wherein the passage 6 is a hole extending through a wall of the outer cylindrical portion 4 or the main nut body 1.

* * * * *